US008959348B2

United States Patent
Tsouri

(10) Patent No.: US 8,959,348 B2
(45) Date of Patent: Feb. 17, 2015

(54) METHODS ESTABLISHING A SYMMETRIC ENCRYPTION KEY AND DEVICES THEREOF

(75) Inventor: Gill Rafael Tsouri, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 927 days.

(21) Appl. No.: 12/795,400

(22) Filed: Jun. 7, 2010

(65) Prior Publication Data

US 2010/0313025 A1    Dec. 9, 2010

Related U.S. Application Data

(60) Provisional application No. 61/184,368, filed on Jun. 5, 2009.

(51) Int. Cl.
| | | |
|---|---|---|
| *H04L 29/06* | (2006.01) | |
| *H04L 9/08* | (2006.01) | |
| *H04L 9/12* | (2006.01) | |

(52) U.S. Cl.
CPC ............... *H04L 9/0891* (2013.01); *H04L 9/12* (2013.01); *H04L 9/0852* (2013.01); *H04L 9/0838* (2013.01); *H04L 2209/08* (2013.01); *H04L 2209/80* (2013.01); *H04L 2209/88* (2013.01)
USPC ............. 713/171; 713/150; 713/168; 726/27; 380/255; 380/259; 380/262

(58) Field of Classification Search
CPC . H04L 9/0852; H04L 2209/08; H04L 9/0838; H04L 9/12

USPC ............ 713/150, 168, 171; 726/27; 380/255, 380/259, 262
See application file for complete search history.

(56) References Cited

U.S. PATENT DOCUMENTS

| | | | |
|---|---|---|---|
| 5,604,806 | A | 2/1997 | Hassan |
| 5,995,533 | A * | 11/1999 | Hassan et al. ............. 375/140 |
| 6,031,913 | A | 2/2000 | Hassan |
| 7,421,075 | B2 | 9/2008 | Hassan |
| RE42,232 | E * | 3/2011 | Schmidt ..................... 257/531 |
| 8,090,101 | B2 * | 1/2012 | Ye et al. ..................... 380/47 |
| 2001/0029579 | A1 * | 10/2001 | Kusakabe et al. ......... 713/172 |
| 2003/0063751 | A1 * | 4/2003 | Bruen et al. ............... 380/278 |
| 2003/0228866 | A1 * | 12/2003 | Pezeshki .................. 455/422.1 |
| 2006/0263096 | A1 * | 11/2006 | Dinu et al. ................. 398/187 |
| 2007/0030967 | A1 * | 2/2007 | Earnshaw ................. 380/209 |
| 2007/0223698 | A1 * | 9/2007 | Tsurumaru ................ 380/256 |

(Continued)

OTHER PUBLICATIONS

Arkko et al., Improved Extensible Authentication Protocol Method for 3rd Generation Authentication and Key Agreement (EAP-AKA'), May 2009, retrieved from draft-arkko-eap-aka-kdf-00 downloaded from http://tools.ietf.org/id/draft-arkko-eap-aka-kdf-00.txt on Jan. 30, 2013.*

(Continued)

*Primary Examiner* — Michael Simitoski
*Assistant Examiner* — Gary Lavelle
(74) *Attorney, Agent, or Firm* — Joseph M. Noto; Bond Schoeneck & King PLLC

(57) ABSTRACT

The present invention is directed to a method for establishing a symmetric encryption key between a first device and a second device. The symmetric encryption key is a function of a phase difference of the signals emitted between the first device and the second device and distance between the first device and the second device.

24 Claims, 6 Drawing Sheets

(56) References Cited

U.S. PATENT DOCUMENTS

2008/0317247 A1* 12/2008 Jeong et al. ............... 380/44
2010/0080386 A1* 4/2010 Donnangelo et al. ......... 380/256
2010/0100936 A1* 4/2010 Brik et al. .................. 726/3

OTHER PUBLICATIONS

Hershey et al., Unconventional Cryptographic Keying Variable Management, Jan. 1995, IEEE Transactions on Communications, vol. 43, No. 1, pp. 4-5, retrieved from http://ieeexplore.ieee.org/stamp/stamp.jsp?arnumber=00385951 on Jan. 20, 2013.*

Havish Koorapaty and Amer A. Hassan, Secure Information Transmission for Mobile Radio, IEEE Communication Letters, vol. 4, No. 2, Feb. 2000, pp. 52-55.*

Diffie, W. et al., "New Directions in Cryptography", IEEE Transactions of Information Theory, 22:644-654, pp. 29-40, 1976.

U.S. National Bureau of Standards (NBS), "Data Encryption Standard (DES)", Federal Information Processing Standards Publication 46-2 (FIPS-46), pp. 1-15, Dec. 1993.

Rivest, R. L. et al., "A Method for Obtaining Digital Signatures and Public-Key Cryptosystems", Communications of the ACM, 21:120-126, pp. 1-15, 1978.

Hershey, J. E. et al., "Unconventional Cryptographic Keying Variable Management", IEEE Trans on Communications, vol. 43, No. 1, pp. 3-6, Jan. 1995.

Koorapaty, H. et al., "Secure Information Transmission for Mobile Radio", IEEE Communications Letters, vol. 4, No. 3, pp. 52-55 Feb. 2000.

Scanlon, W. G. et al., "Radiowave Propagation from a Tissue-Implanted Source at 418 MHz and 916.5 MHz", IEEE Trans on Biomedical Engineering, vol. 47, No. 4, pp. 527-534, Apr. 2000.

Cherukuri, S. et al., "BioSec: A Biometric Based Approach for Securing Communication in Wireless Networks of Biosensors Implanted in the Human Body", Proceedings of the International Conference on Parallel Processing Workshops, pp. 1-8, 2003.

Kim, J. et al., "Implanted Antennas Inside a Human Body: Simulations, Designs, and Characterizations", IEEE Trans on Microwave Theory and Techniques, vol. 52, No. 8, pp. 1934-1943, Aug. 2004.

Valdastri, P. et al., "An Implantable Telemetry Platform System for in Vivo Monitoring of Physiological Parameters", IEEE Trans on Information Technology in Biomedicine, vol. 8, No. 3, pp. 271-278, Sep. 2004.

Wang, L. et al., "A Programmable Microsystem Using System-on-Chip for Real-time Biotelemetry", IEEE Trans on Biomedical Engineering, vol. 52, No. 7, pp. 1251-1260, Jul. 2005.

Drew, T. et al., "Implantable Medical Devices as Agents and Part of Multiagent Systems", In 5th International Joint Conference on Autonomous Agents and Multiagent Systems, pp. 1534-1541, 2006.

Bellissimo, A. et al., "Secure Software Updates: Disappointments and New Challenges", In Proceedings of USENIX Workshop on Hot Topics in Security, pp. 37-43, 2006.

Halperin, D. et al., "Security and Privacy for Implantable Medical Devices", IEEE Pervasive Computing, Special Issue on Implantable Electronics, vol. 7, No. 1, pp. 30-39, Jan.-Mar. 2008.

Tsouri, G. et al., "Reverse Piloting Protocol for Securing Time Varying Wireless Channels", IEEE Wireless Telecommunications Symposium, pp. 1-7, 2008.

Halperin, D. et al., "Pacemarkers and Implantable Cardiac Defibrillators: Software Radio Attacks and Zero-Power Defenses", IEEE Symposium on Security and Privacy, pp. 1-14, 2008.

Zhou, Y. et al., "Securing Wireless Sensor Networks: A Survey", IEEE Communications Surveys & Tutorials, vol. 10, No. 3, pp. 6-28, 3rd Quarter 2008.

Cong, P. et al., "A Wireless and Batteryless 130mg 300iW 10b Implantable Blood-Pressure-Sensing Microsystem for Real-Time Genetically Engineered Mice Monitoring", IEEE International Solid-State Circuits Conference, Session 25, pp. 428-430, 2009.

Tsouri, G. R. et al., "Method of Securing Resource-Constrained Wireless Enabled Devices via Channel Randomness", ICCE Conference, Jan. 2010.

Tsouri, G. R., "Securing Wireless Communication with Implanted Medical Devices using Reciprocal Carrier-Phase Quantization", IEEE, 2009.

* cited by examiner

TABLE 1. PARAMETERS FOR ILLUSTRATIVE SCENARIO

| $f_c$[MHz] | $\Delta f$[Hz] | $T$[ms] | $T_p$[s] | $T_{key}$[s] | | | $E_{key}$[μw] | | |
|---|---|---|---|---|---|---|---|---|---|
| | | | | $K=16$ | $K=64$ | $K=128$ | $K=16$ | $K=64$ | $K=128$ |
| 418 | 0.7 | 0.5 | 1.4 | 5.6 | 22.4 | 44.8 | 2 | 8 | 16 |
| 916.5 | 1.5 | 0.2 | 0.7 | 2.8 | 11.2 | 22.4 | 0.8 | 3.2 | 6.4 |

*FIG. 5*

METHODS ESTABLISHING A SYMMETRIC ENCRYPTION KEY AND DEVICES THEREOF

This application claims the benefit of U.S. Provisional Patent Application Ser. No. 61/184,368, filed Jun. 5, 2009, which is hereby incorporated by reference in its entirety.

FIELD

This invention relates to methods for establishing a symmetric encryption key and system thereof.

BACKGROUND

Typically, the most straight forward approach to secure a communication link is through the use of traditional encryption algorithms which are roughly categorized as symmetric and asymmetric.

In symmetric encryption, both communication devices use a common secret key pre-shared prior to deployment and accompanying encryption and decryption algorithms. Two widely used symmetric encryption methods are the Data Encryption Standard (DES) and the Advanced Encryption Standard (AES).

In asymmetric encryption, a private and public key pair is used. The public key is made available to the world so that any source can encrypt data, but the private key is known only to the receiver so that no other can perform decryption. A widely used asymmetric encryption algorithm is Rivest Shamir Adleman (RSA).

Other encryption methods, such as DES, AES and RSA, also all provide secure communication provided a large enough key. However, these algorithms were originally developed for computer networks and the cost associated with their implementation is high in terms of memory space, computation power and energy consumption. These costs make their implementation problematic in resource-constrained devices.

A possible alternative to a practically unbreakable AES with 128 bits is to use an algorithm with less complexity and a smaller key size—DES with 56 bits for example or a stream cipher. Periodic key refreshment may be used to compensate for the smaller key. Many methods for securely refreshing a key rely on the Diffie-Hellman algorithm which demands considerable resources as well.

SUMMARY

A method for establishing a symmetric encryption key includes determining at one of a plurality of communication devices a first phase difference based on a first transmission from another one of the plurality of communication devices. A first new encryption key is generated based on the determined first phase difference at the one of the plurality of communication devices. At another one of the plurality of communication devices a second phase difference is generated based on a second transmission from the one of the plurality of communication devices. A second new encryption key is generated based on the determined second phase difference at another one of the plurality of communication devices. Authenticity of the generated first new encryption key and the generated second new encryption key is determined. Communication between the one of the plurality of communication devices and another one of the plurality of communication devices is established when the generated first new encryption key and the generated second new encryption key are determined to be authenticate.

A computer readable medium having stored thereon instructions for establishing a symmetric encryption key comprising machine executable code which when executed by at least one processor, causes the processor to perform steps including determining at one of a plurality of communication devices a first phase difference based on a first transmission from another one of the plurality of communication devices. A first new encryption key is generated based on the determined first phase difference at the one of the plurality of communication devices. At another one of the plurality of communication devices a second phase difference is generated based on a second transmission from the one of the plurality of communication devices. A second new encryption key is generated based on the determined second phase difference at another one of the plurality of communication devices. Authenticity of the generated first new encryption key and the generated second new encryption key is determined. Communication between the one of the plurality of communication devices and another one of the plurality of communication devices is established when the generated first new encryption key and the generated second new encryption key are determined to be authenticate.

A secure communication system includes first and second phase determination devices, first and second key generation devices, an authentication processing system, and a communication system. The first phase determination device determines at one of a plurality of communication devices a first phase difference based on a first transmission from another one of the plurality of communication devices. The second phase determination device determines at another one of the plurality of communication devices a second phase difference based on a second transmission from the one of the plurality of communication devices. The first key generation device generates a first new encryption key based on the determined first phase difference at the one of the plurality of communication devices. The second key generation device generates a second new encryption key based on the determined second phase difference at another one of the plurality of communication devices. The authentication processing system determines authenticity of the generated first new encryption key and the generated second new encryption key. The communication system establishes communication between the one of the plurality of communication devices and the another one of the plurality of communication devices when the generated first new encryption key and the generated second new encryption key are determined to be authenticate.

This technology provides a more effective and secure method and system for generating a symmetric encryption key. Examples of this technology extract an encryption key by utilizing a reciprocal carrier-phase quantization. Other examples of this technology extract an encryption key from in-phase and quadrature components used as information carrying waveforms in an existing standard or some proprietary communication system. Another advantage of this technology is that unlike prior techniques, this technology can be applied to existing communication signals and does not have to rely on dedicated signals.

This technology can be easily and economically utilized in a variety of different applications. For example, this technology can be used to automatically set up secure encryption keys to achieve confidential communication in wireless personal area networks (WPANs) used for applications, such as medical monitoring. Additionally, this technology can be used in a variety of different communication environments,

BRIEF DESCRIPTION OF THE DRAWINGS

FIG. 5 is a table of parameters for an illustrative example of this technology used with an implanted medical device and a medical monitoring device;

DETAILED DESCRIPTION

Figure 1:
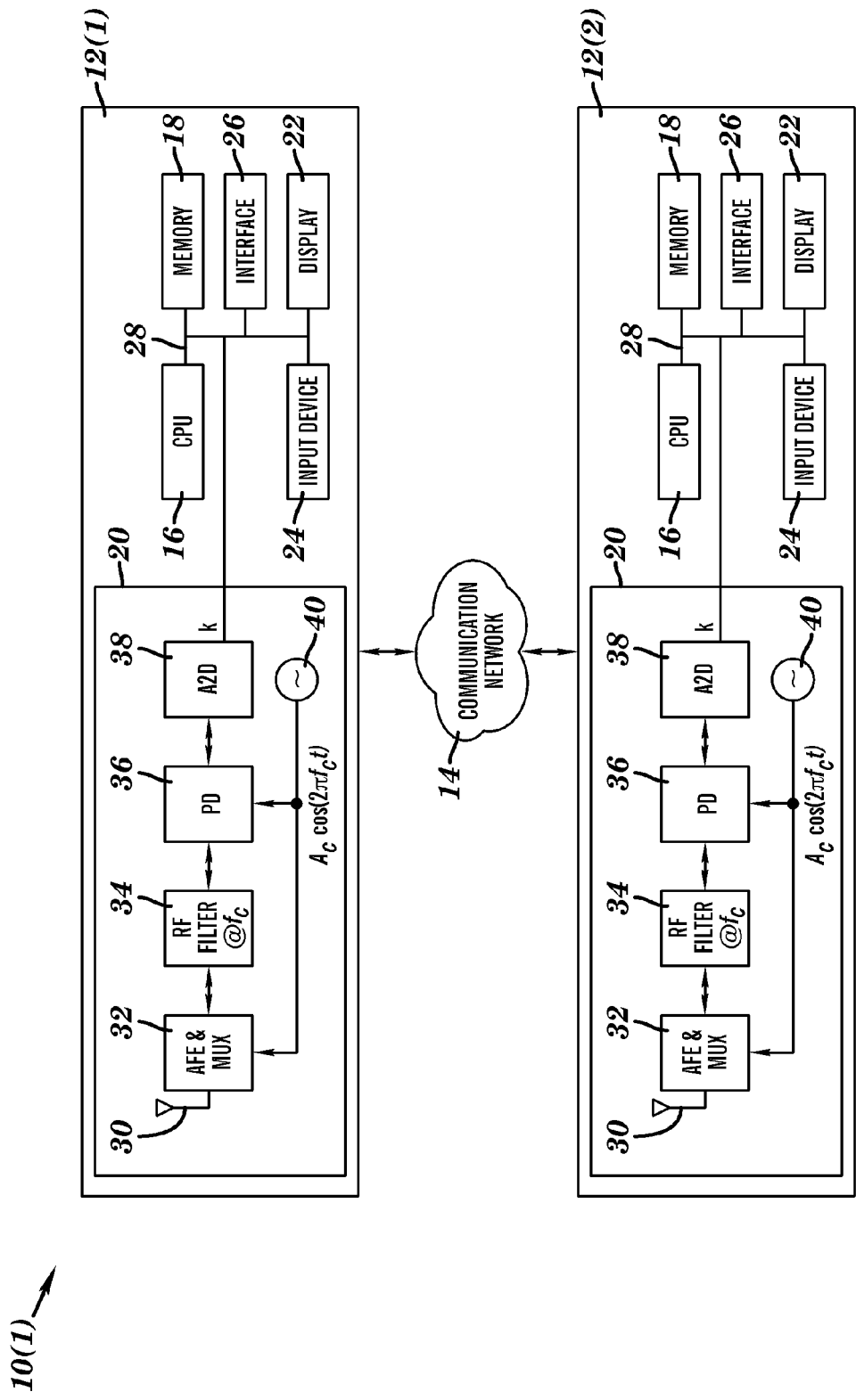
FIG. 1 is a block diagram of an exemplary environment with exemplary communication devices in accordance with embodiments of this technology.
Figure 2:
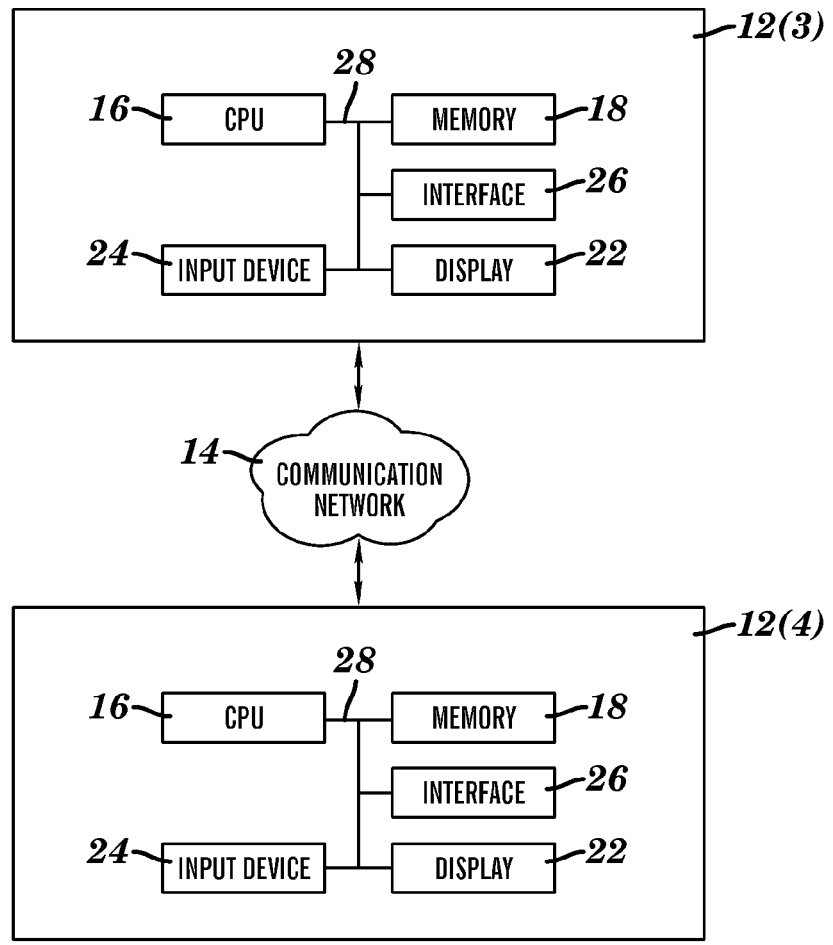
FIG. 2 is a block diagram of another exemplary environment with other exemplary communication devices in accordance with other embodiments of this technology.

An exemplary environment 10(1) with communication devices 12(1)-12(2) is illustrated in FIG. 1 and another exemplary environment 10(2) with communication devices 12(3)-12(4) is illustrated in FIG. 2. The exemplary environment 10(1) includes the communication devices 12(1)-12(2) coupled together by a communications network 14 and the other exemplary environment 10(2) includes the communication devices 12(3)-12(4) coupled together by a communications network 14, although each of the exemplary environments 10(1)-10(2) could have other numbers and types of components, parts, devices, systems, and elements coupled together in other configurations. This technology provides a number of advantages including providing a more effective and secure method and system for generating a symmetric encryption key.

In exemplary environment 10(1) each of the communication devices 12(1)-12(2) is able to establish and conduct secure communications with other communication devices 12(1)-12(2) through communication network 14 and in exemplary environment 10(2) each of the communication devices 12(3)-12(4) is able to establish and conduct secure communications with other communication devices 12(3)-12(4) through communication network 14, although one or more of the communication devices could perform other types and numbers of functions. The communication devices 12(1)-12(4) can comprise a variety of different types and numbers of devices. By way of example only, the communication devices 12(1)-12(2) could comprise a medical monitoring device and an Implanted Medical Devices (IMDs) while the communication devices 12(3)-12(4) can comprise digital communication devices that communicate through data packet transfers.

Each of the communication devices 12(1)-12(4) includes a central processing unit (CPU) or processor 16, a memory 18, a display 22, a user input device 24, and an interface system 26 and which are coupled together by a bus or other link 28, although one or more of the communication devices 12(1)-12(4) can include other numbers and types of components, parts, devices, systems, and elements in other configurations. Additionally, in the exemplary environment 10(1) the communication devices 12(1)-12(2) also include a key encryption apparatus 20, although again other numbers and types of components, parts, devices, systems, and elements coupled together in other configurations could be used.

The processor 16 in each of the communication devices 12(1)-12(4) executes a program of stored instructions for one or more aspects of the present invention as described and illustrated herein including methods for establishing a symmetric encryption key, although the processor 16 could execute other numbers and types of programmed instructions.

The memory 18 in each of the communication devices 12(1)-12(4) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 16, can be used for the memory 18 in each of the communication devices 12(1)-12(4).

The optional display 22 in each of the communication devices 12(1)-12(4) is used to show data and information, although the display can be used for other purposes. The optional user input device 24 in each of the communication devices 12(1)-12(4) is used to input selections, such as requests to establish secure communications, although the user input device could be used to input other types of data and interact with other elements. The user input device 24 can include a keyboard, although other types and numbers of user input devices can be used. The interface system 26 in each of the communication devices 12(1)-12(4) can be used to manage communications between the communication devices 12(1)-12(2) over the communications network 14 or between the communication devices 12(3)-12(4) over the communications network 14 in these examples.

The communication devices 12(1)-12(2) in the exemplary environment 10(1) also each include a key encryption apparatus 20 includes an antenna 30, an analog-front-end and multiplexer 32, a RF filtering device 34, a phase detector device 36, an analog-to-digital converter 38, and a local oscillator 40, although the key encryption apparatus 20 could include other numbers and types of components, parts, devices, systems, and elements coupled together in other configurations. The antenna 30 is coupled to the analog-front end and multiplexer 32 and is able to receive and transmit carrier wave signals which may contain embedded information. The analog-front end and multiplexer 32 is coupled to the antenna 30, the RF filtering device 34, and the local oscillator and either processes the received carrier wave signals which may contain embedded information or prepares the carrier wave signals which may contain embedded information for transmission using the local oscillator signal from local oscillator 40. The RF filtering device is coupled between the analog-front end and multiplexer 32 and the phase detector device 36 and comprises a narrowband RF filter, although other types and numbers of filters or no filtering could be used. The phase detector device 36 is coupled to the RF filtering device 34, the analog-to-digital converter 38, and the local oscillator 40 and determines a phase difference between a received carrier wave signal and a local carrier wave signal from the local oscillator 40, although other types and numbers of difference determination systems could be used. The analog to digital converter device 38 converts the phase difference from the phase detector device 36 into a digital signal, although other types and numbers of quantization systems, devices and elements could be used.

Although embodiments of the communication devices 12(1)-12(4) are described and illustrated herein in two exemplary environments, each of the communication devices 12(1)-12(4) can be implemented on any suitable computer system, computing device, application specific integrated circuit or other programmable or hardwired device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, micro-controllers, application specific integrated circuits, and other programmable logic that is programmed according to the teachings of the embodiments, as described and illustrated herein, and as will be appreciated by those of ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), Body Area Networks (BANs), Wireless Sensor Networks (WSNs), Implanted Medical Devices (IMDs), wearable computers and devices, the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The operation of the exemplary environment 10(1) will now be described below with reference to FIGS. 1 and 3-5. In this exemplary environment 10(1), a symmetric encryption key is established by reciprocal evaluation of a carrier-phase between a local oscillator 40 at one of the communication devices 12(1)-12(2) and a local oscillator 40 at another one of the communication devices 12(1)-12(2) which is trying to establish a secure communication, although other manners for obtaining and quantizing phase to obtain a symmetric encryption key could be used, such as illustrated and described with reference to the exemplary environment 10(2).

When the communication devices 12(1)-12(2) want to establish a secure communication between each other, each of these communication devices 12(1)-12(2) take turns in transmitting the output from the local oscillator 40 to the other one of the communication devices 12(1)-12(2). While one communication devices 12(1)-12(2) is transmitting the other one of the communication devices 12(1)-12(2) is performing quantization on the detected phase between its own output from the local oscillator 40 of one of the communication devices 12(1)-12(2) and the received version of the other output from the other local oscillator 40 of the other one of the communication devices 12(1)-12(2).

The phase is a function of the frequency of the carrier wave signal provided by the local oscillator 40 in each of the communication devices 12(1)-12(2), the propagation time from one of the communication devices 12(1)-12(2) to another one of the communication devices 12(1)-12(2), and the phase offset between the local oscillators 40 in each of the interacting communication devices 12(1)-12(2). The propagation time is a direct function of the distance between the interacting communication devices 12(1)-12(2) and is unique to their relative location in space. A random change in this distance on the order of the carrier wavelength would result in a new unique phase. Due to the reciprocity property of communication channels the carrier-phase is identical in both directions. The phase may be assumed to be constant for a short time span, during which symmetric key bits may be generated by quantizing the detected phase from the phase detector 36 with the analog-to-digital conversion device 38 at each of the communication devices 12(1)-12(2).

If random relative movement occurs between the communication devices 12(1)-12(2) the phase would de-correlate over time allowing for repeating this operation after sufficient time has passed. It follows that a new key could be established for secure communications between the communication devices 12(1)-12(2) after changing the relative distance.

An eavesdropper would have no way of knowing this phase because without access to the local oscillator 40 in each of the interacting communication devices 12(1)-12(2). The eavesdropper could only obtain knowledge of the phase between the local oscillator 40 of one of the communication devices 12(1)-12(2) and its own local oscillator which would be useless for deciphering.

In the exemplary environment 10(1), in order to extract an encryption key from the random phase each of the communication devices 12(1)-12(2) is equipped with a key encryption apparatus 20 which operates as described below. There are at least two modes of operation for each of the communication devices 12(1)-12(2): transmit (TX); and receive (RX). In the transmit mode, the antenna 30 in one of the communication devices 12(1)-12(2) emits a carrier wave with frequency $f_c$ for a short duration of T seconds. In the receive mode, the key encryption apparatus 20 receives and filters the incoming signal with the RF filtering device 34 at narrowband about the frequency $f_c$. The filtered signal is fed to the phase detector device 36 in one of the communication devices 12(1)-12(2) along with the local oscillator output from the local oscillator 40 in one of the communication devices 12(1)-12(2). The detected phase output from the phase detector device 36 is a signal (in volts) which is monotonic with regard to the phase (in radians) at its input. The phase detector device 36 provides this signal to the analog-to-digital converter device 38 which performs quantization of this signal. The output of the analog-to-digital converter device 38 is sampled every T seconds and is noted as a vector k of k bits.

In the exemplary environment 10(1), each of the communication devices 12(1)-12(2) is also loaded with an initial symmetric key prior to deployment. It is also assumed that random movement of at least one of the communication devices 12(1)-12(2) results in an average relative speed v between the communication devices 12(1)-12(2). Such movement could be attributed for example to mobility of one of the communication devices 12(1)-12(2) or deliberate movement induced by a manual or automatic system.

Accordingly, with the understandings illustrated and explained above an example of establishing a new symmetric encryption key of K bits will now be described below. First, one of the communication devices 12(1)-12(2) initiates key establishment using the current key for authentication. The initiating one of the communication devices 12(1)-12(2) operates its' key encryption apparatus 20 in a transmit mode for T seconds. During this time the other one of the communication devices 12(1)-12(2) operates its key encryption apparatus 20 in a receive mode RX and evaluates k key bits. Next, the other one of the communication devices 12(1)-12 (2) operates its' key encryption apparatus 20 in a transmit mode TX for T seconds. The initiating one of the communication devices 12(1)-12(2) operates its key encryption apparatus 20 in a receive mode RX and evaluates k new key bits. Both of the communication devices 12(1)-12(2) pause for $T_p$ seconds and then each repeat the transmit and receive modes described above until K bits are evaluated by both of the communication devices 12(1)-12(2).

Once the desired number of K bits has been obtained, an authentication challenge using a concatenation of the new encryption key and the old encryption key is sent from the initiating one of the communication devices 12(1)-12(2), although other manners for authentication could be used. When the other one of the communication devices 12(1)-12 (2) receives the authentication challenge, the other one of the communication devices 12(1)-12(2) using a concatenation of the new encryption key and the old encryption key replies with a challenge response, although again other manners for authentication could be used. The initiating one of the communication devices 12(1)-12(2) checks the challenge response received from the other one of the communication devices 12(1)-12(2). If the one of the communication devices 12(1)-12(2) determines the response is valid, then communication is established with each of the communication devices 12(1)-12(2) utilizing the generated new encryption key. If the one of the communication devices 12(1)-12(2) determines the response is invalid, then the steps described above can be repeated or symmetric encryption key establishment is aborted. Note with this technology there is no need for accurate synchronization of the communication devices 12(1)-12 (2).

The movement of the key encryption apparatus 20 in each of the communication devices 12(1)-12(2) coupled by the pause for $T_p$ seconds are required for randomly changing the carrier-phase so that a new set of k bits which are uncorrelated with the previously generated k bits are obtained. The minimal v (resulting from random movement) and minimal $T_p$ required for generating successive key bits are set according to a system at hand. Additionally, the option for stopping when the authentication response is determined to be invalid is for cases, such as temporary unfavorable channel conditions or a deliberate jamming attack.

The values of $f_c$, K, k, v, T and $T_p$ have to be set according to the system at hand and require some balancing act. In general: T is required to be large enough to allow for accurate phase detection, but not too long so that power consumption remains low and the phase does not change due to v during the transmit and receive modes by each of the communication devices 12(1)-12(2). $T_p$ is required to be large enough to have the phase de-correlate in time according to v, but not too large so that successive key bits are obtained in reasonable time. k has to be set large so that the full key K is obtained in reasonable time, but not too large to avoid key establishment failure due too different quantization errors at the communication devices 12(1)-12(2).

Accordingly, as illustrate and described herein this technology can be used to efficiently secure wireline and wireless communications with resources-constrained devices. By way of example only, one exemplary environment would be a communication link between a medical monitoring device acting as one of the communication devices 12(1)-12(2) and an implanted medical device (IMD) acting as the other one of the communication devices 12(1)-12(2).

An exemplary experimental verification of the environment 10(1) with the communication devices 12(1)-12(2) is set forth below:

In what follows the probability of key establishment success and constraints on the values of system parameters $f_c$, K, k, v, T, and $T_p$ are derived. For the scope of this analysis it is assumed that the RF filtering device 36 has a very narrow frequency band, resulting in negligible noise passing from the antenna into the remaining circuit. Such narrow-band filtering may be achieved by using a resonant circuit for example. The phase detector device 36 is assumed to be ideal, meaning it is completely linear in the entire phase range. For the sake of discussion the output from the phase detector device 36 is assumed to be scaled to the range (−1,1) in volts. The $2^k$ quantization levels at the output from the analog-to-digital converter device 38 are assumed to be uniformly spread out over the range (−1,1).

Evaluating Successful Key Establishment:

Since almost no noise enters the phase detector device 36 it may be assumed that the independent circuit noises of the communication devices 12(1)-12(2) are the prime cause of different quantization and hence key failure. In addition, phase detector devices 36 can be designed to operate with high accuracy for low-powered incoming signals as long as the received signal is above the circuit sensitivity threshold. Circuit noise may assume various forms, but is predominately due to thermal noise. For the scope of this analysis circuit noise is modeled as a zero-mean Additive White Gaussian Noise (AWGN) as is commonly done for thermal noise. The output from the phase detector device 36 or the input to the analog-to-digital device 38 is therefore modeled by:

$$V_{PD} = \theta + n, \quad (1)$$

where n denotes AWGN with variance $\sigma_n^2$ and θ denotes the phase in (volts) between the input signals. θ is commonly modeled as a uniformly distributed random variable. A Circuit Noise Level (CNL) is defined with reference to the average energy of the PD output as follows $$CNL = \frac{E[\theta^2]}{\sigma^n}. \quad (2)$$

The uniform quantization function of the analog-to-digital device 38 may be written explicitly to give the output from the analog-to-digital device 38 as:

$$V_{A2D} = \frac{\lfloor V_{PD} 2^k \rfloor}{2^k}. \quad (3)$$

The probability for having the same quantization at both communication devices 12(1)-12(2) is given by $$p = Pr(\lfloor V_{PD}^M 2^k \rfloor = \lfloor V_{PD}^{IMD} 2^k \rfloor), \quad (4)$$

where $V_{PD}^1$ and $V_{PD}^2$ are the output from the phase detector device 36 of the communication devices 12(1)-12(2) respectively. Using (1) in (4) gives $$p = Pr(\lfloor (\theta + n^m) 2^k \rfloor = \lfloor (\theta + n^{IMD}) 2^k \rfloor). \quad (5)$$

where $n^1$ and $n^2$ are the circuit noises of the communication devices 12(1)-12(2) respectively.

p is the probability for obtaining the same key bits for a single round of phase quantization.

To obtain K bits successful phase quantization must be repeated $$\left\lceil \frac{K}{k} \right\rceil$$

times in sequence. Assuming that $T_p$ is large enough so that consecutive phase quantizations are uncorrelated, the probability for successful key establishment is given by $$P_{key} = p^{\lceil K/k \rceil}. \tag{6}$$

Using (5) in (6) gives $$P_{key} = \{Pr(\lfloor (\theta + n^M) 2^k \rfloor = \lfloor \theta + n^{IMD}) 2^k \rfloor )\}^{\lceil K/k \rceil}, \tag{7}$$

$$\theta \sim U[0,1); \, n^M \sim N(0,\sigma_n^2); \, n^{IMD} \sim N(0,\sigma_n^2). \tag{8}$$

$P_{key}$ may be evaluated using numerical computation or computer simulation.

Setting Parameters for the Key Encryption Apparatus:

The key size K must be set according to the symmetric encryption method or standard. DES for example requires a minimum of K =56 and AES requires a minimum of K =128. For DES and AES key refreshing may be done on rare occasions or not at all. An interesting option is to use a less secure, but highly resource-efficient symmetric encryption method with a smaller key size, and couple its operation with frequent key refreshment.

The number of bits extracted per phase k has to be set according to the acceptable value of p, the analog-to-digital device 38 at hand and the required key refreshing rate. The following tradeoff needs to be resolved: to keep p low and the analog-to-digital device 38 simple a low k is preferred. However, to achieve a faster key refreshing rate a high k is required.

The average relative speed v has to be low enough so that negligible Doppler shift occurs. Substantial Doppler shift would cause the received signal to be out of band of the narrow-band RX filter. The Doppler shift is given by:

$$\Delta f = \frac{vf_c}{C}, \tag{9}$$

where C is the speed of light. To keep $\Delta f$ the order of a few KHz v should be kept below 300 m/sec for fc=1GHz. v is expected to be much lower than that. It follows that so Doppler shift could probably be ignored.

The carrier pulse duration T in each direction should be made small enough so that the phase remains practically unchanged during reciprocal phase detection and quantization (a period of 2T). The phase is dynamic and is governed by the distance between the communication devices 12(1)-12(2) which changes over time according to v. The maximal change occurs when v is in the direction of the line connecting the communication devices. Assuming this is the case the change in phase during 2T is given by $$\Delta \theta = 2\pi f_c \Delta t = 2\pi f_c \left( \frac{2Tv}{C} \right), \tag{10}$$

where 2Tv is the average change in distance, and it is assumed for simplicity that waves propagate through tissue at roughly the speed of light. Assuming a change in phase under one hundredth of a single quantization level in the analog-to-digital device 38 is negligible.

$$\Delta \theta \leq \frac{2\pi}{2^k 100}. \tag{11}$$

Using (10) and (11) gives $$T \leq \frac{C}{200 v f_c 2^k}. \tag{12}$$

The pause period between successive phase quantizations $T_p$ should be large enough to allow the phase to de-correlate in time. Assuming that an average shift corresponding to one wavelength is enough $$\Delta \theta = \frac{2\pi f_c v T_p}{C} \geq 2\pi, \tag{13}$$

which reduces to:

$$T_p \geq \frac{C}{f_c v}. \tag{14}$$

Having $T_p$, T and $P_{key}$ the key establishment time $T_{key}$ may be evaluated. Assuming key establishment is repeated if failed and that two successive failures are a negligible occurrence due to high $P_{key}$ $$T_{key} \cong (2T + T_p) \left\lceil \frac{K}{k} \right\rceil (2 - P_{key}), \tag{15}$$

disregarding authentication time which depends on the encryption method being used.

Note that during most of this time the key encryption apparatus 20 was being idle waiting for the phase to de-correlate. This idle time could be used for transmitting data, so that key establishment is interleaved with data transmission.

For successfully establishing the key each key encryption apparatus 20 spent an average energy of $$E_{key} = P_t T \left\lceil \frac{K}{k} \right\rceil (2 - P_{key}), \tag{16}$$

where $P_t$ is the transmitted power.

In what follows the probability of successful key establishment $P_{key}$ is evaluated for several key sizes K and quantization bits k. The results were obtained through computer simulations using 106 trials of key generation. In addition, T, $T_p$, $T_{key}$, and $E_{key}$ are evaluated for an illustrative scenario.

Figure 3:
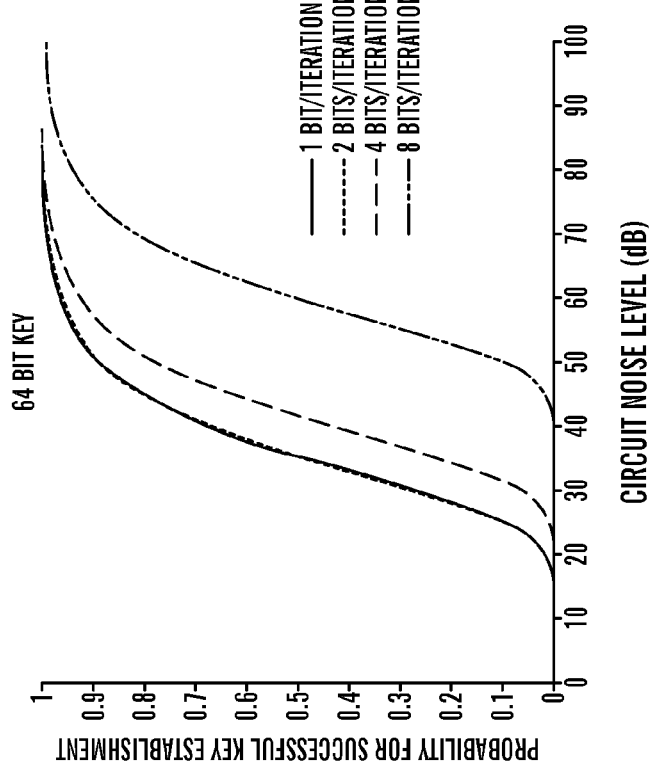
FIG. 3 is a graph illustrating a probability of successful key establishment for a 64 bit key versus circuit noise level [dB]

Referring to FIG. 3, $P_{key}$ is depicted as a function of CNL for K=64 and k=1,2,4,8. Note that $P_{key}$ for k=1,2 is about the same, so at least two bits should be extracted per iteration of phase quantization. To achieve a $P_{key}$ close to 1 the CNL is required to be larger than 60 dB, 60 dB, 70 dB, 90 dB for k=1,2,4,8 respectively. The increase in required CNL when using k=4 instead of k=2 is tolerable compared to using k=8. The same trends were observed for K=16,128.

Figure 4:
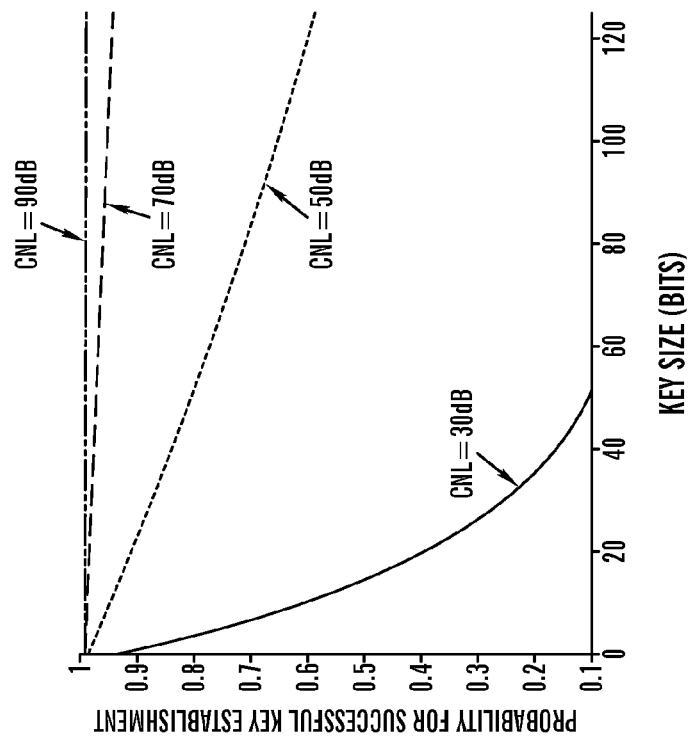
FIG. 4 is a graph illustrating a probability of successful key establishment for a 64 bit key versus key size [bits]

Referring to FIG. 4, $P_{key}$ is displayed as a function of K for k=4 and CNL=30 dB, 50 dB, 70 dB, 90 dB. CNL=30 dB is not enough to support reliable key establishment. Reliability is achieved for all key sizes up to at least 128 when CNL≥70 dB.

Illustrative Scenario—Implanted Medical Devices:

In an illustrative scenario an example of this technology is used to secure communications between an implanted medical device (IMD) acting as one of the communication devices 12(1) and a medical monitoring device acting as the other one of the communication devices 12(2) in the exemplary environment 10(1). A caregiver is facilitating key refreshment by manually moving the key encryption apparatus 20 in one of the communication devices 12(1)-12(2) in random at an average speed of v=0.5[m/s]. Alternatively, the random movement can be induced automatically. It is assumed that k=4 is used and that the CNL is high enough to achieve $P_{key}$=0.99. The resulting parameters according to (9), (12), (14), (15) and (16) for K=16,64,128 and $f_c$=418 MHz, 916.5 MHz are summarized in table 1 shown in FIG. 5. Note that the Doppler shifts are indeed negligible, the time to establish a new key is on the order of seconds and the required energy is on the order of microwatts ($P_t$=1 mw was assumed for $E_{key}$).

Figure 6:
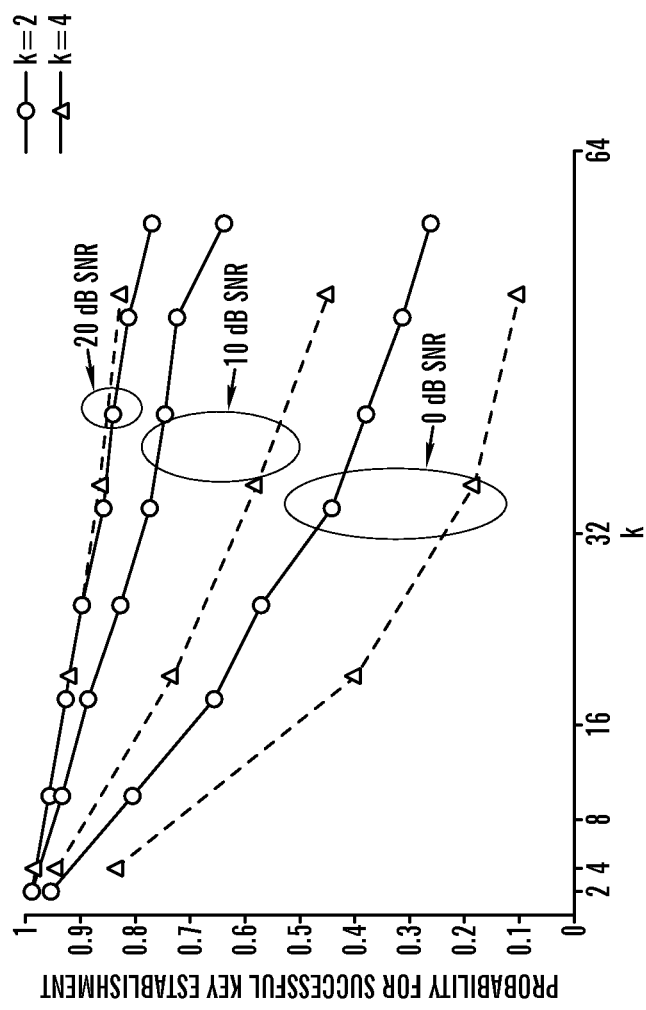
FIG. 6 is another graph illustrating a probability of successful key establishment in the ZigBee protocol using a preamble of a data packet.
Figure 7:
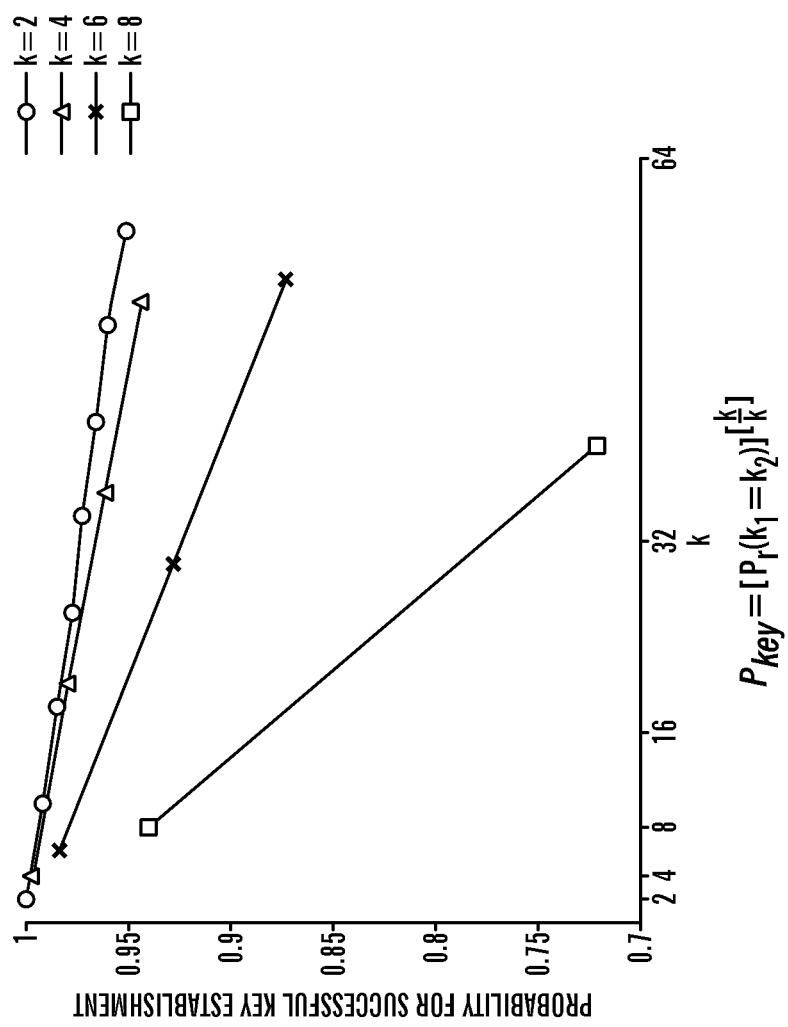
FIG. 7 is another graph of illustrating a probability of successful key establishment.

The operation of another exemplary environment 10(2) will now be described below with reference to FIGS. 2, 6, and 7. In this exemplary environment 10(2), the phase is extracted from in-phase and quadrature components used as information carrying waveforms in an existing standard or some proprietary communication system. For example, in the IEEE 802.15.4 standard for personal area networks Offset QPSK is used for communications. As illustrated by this example, this technology can be applied to existing communication signals and does not have to rely on or use dedicated signals. The following exemplary method could be used to extract the phase, although other methods for extracting phase from existing communication signals can be used.

The data packet structure is such that N symbols are known a-priori for the two interacting communication devices 12(3)-12(4) (a preamble field for example), that carrier in-phase and quadrature components are used for encoding information and that packets go back and forth between the two devices in rapid succession (data packet and an immediate acknowledgement packet for example). A protocol for refreshing a K bits key between communication devices 12(3)-12(4) is set forth below.

First, one of the communication devices 12(3)-12(4) in the exemplary environment 10(2) sends a data packet to the other one of the communication devices 12(3)-12(4). The other one of the communication devices 12(3)-12(4) estimates the channel phase by observing N symbols known a-priori. The other one of the communication devices 12(3)-12(4) quantizes its estimate to generate k bits. The other one of the communication devices 12(3)-12(4) immediately sends a packet to the initiating one of the communication devices 12(3)-12(4). The initiating one of the communication devices 12(3)-12(4) estimates the channel phase by observing N symbols known a-priori. The initiating one of the communication devices 12(3)-12(4) quantizes its estimate to generate k bits. The exemplary steps described above are repeated times until sufficient bits for a new symmetric encryption key are established.

Once the desired number of K bits has been obtained, an authentication challenge using a concatenation of the new encryption key and the old encryption key is sent from the initiating one of the communication devices 12(3)-12(4), although other manners for authentication could be used.

When the other one of the communication devices 12(3)-12(4) receives the authentication challenge, the other one of the communication devices 12(3)-12(4) using a concatenation of the new encryption key and the old encryption key replies with a challenge response, although again other manners for authentication could be used. The initiating one of the communication devices 12(3)-12(4) checks the challenge response received from the other one of the communication devices 12(3)-12(4). If the one of the communication devices 12(3)-12(4) determines the response is valid, then communication is established with each of the communication devices 12(3)-12(4) utilizing the generated new encryption key. If the one of the communication devices 12(3)-12(4) determines the response is invalid, then the steps described above can be repeated or symmetric encryption key establishment is aborted.

To detect the phase in this exemplary environment 10(2) for quantization, IEEE 802.15.4 which uses Offset Quadrature Phase Shift Keing (OQPSK) is utilized, although other manners for detecting phase can be used. A complex symbol $r_i$, is formed by taking the inputs of the PN-sequence de-correlator of the in-phase and quadrature components as the real and imaginary parts of $r_i$ respectively. The result is a set $\{r_i\}_{i=1}^N$ of complex baseband symbols corresponding to the a-priori known transmitted symbols.

$$r_i = A|h|e^{j\phi i}e^{j\alpha} + n_i, \quad (17)$$

where $|h|$ is the channel attenuation, $\alpha$ is the channel phase, and $n_i$, is a Gaussian thermal noise sample. $|h|$ and $\alpha$ are practically constant for the duration of two packets going back and forth in rapid succession. $\phi_i$ belongs to the set $$\left[0, \frac{\pi}{2}, \pi, \frac{3\pi}{2}\right]$$

and $\{\phi i\}_{i=1}^N$ correspond to the N a-priory known symbols. We remove $\{\phi i\}_{i=1}^N$ out of $\{r_i\}_{i=1}^N$ by performing the following unitary operation:

$$p_i = r_i e^{-j\phi i} = A|h|e^{j\alpha} + n_i e^{-j\phi i}. \quad (18)$$

The unitary operation doesn't change the noise statistics. Estimating $A|h|e^{j\alpha}$ from $\{p_i\}_{i=1}^N$ is classical problem of parameter estimation in Gaussian noise. The maximum-likelihood estimator given by the sampled mean of the observations:

$$A|h|e^{j\alpha} \approx \frac{1}{N}\sum_{i=1}^{N} p_i. \quad (19)$$

Extracting $\alpha$ from (3) is done by calculating:

$$\hat{\alpha} = \arctan\left(\frac{\operatorname{Im}\left\{\sum_{i=1}^{N} p_i\right\}}{\operatorname{Re}\left\{\sum_{i=1}^{N} p_i\right\}}\right). \quad (20)$$

Quantizing the phase estimate to generate a vector of k bits is done by applying a quantization function to $\hat{\alpha}$:

$$k = \left\lceil \hat{\alpha} \frac{2^k}{2\pi} \right\rfloor. \quad (21)$$

The probability of successful key refreshing is $$P_{key} = [P_r(k_1 = k_2)]^{\left\lceil \frac{K}{k} \right\rceil}, \quad (22)$$

where $k_1$ and $k_2$ are k for communication devices 12(3) and 12(4) respectively.

Exemplary Implementation in a Zigbee Enabled Device

This example of the technology in the exemplary environment 10(2) was evaluated using computer simulations of a ZigBee enabled device operating in a Rayleigh fading environment. A typical ZigBee packet with 320 preamble symbols was assumed. FIG. 6 depicts $P_{key}$ for N=320 using the preamble of a data packet and FIG. 7 illustrates key establishment in the ZigBee protocol using full packet for SNR of 20 dB. SNRs and k=2, 4. High $P_{key}$ is achieved for SNR>10 dB.

Performance can be significantly improved by making use of detection feedback. If a packet is received without error, for example if the checksum field in the packet indicates no error, then the received data symbols can be viewed as a-priory known symbols. The result is that the entire packet is used for estimating the phase rather than just the preamble field. FIG. 7 depicts $P_{key}$ for an overall packet size of 100 bytes, various k and SNR of 20 dB. $P_{key}$ values higher than 0.95 are achievable.

Accordingly, as illustrated and described with the examples herein, this technology provides a more effective and secure method and system for generating a symmetric encryption key. Examples of this technology extract an encryption key by utilizing a reciprocal carrier-phase quantization. Other examples of this technology extract an encryption key from in-phase and quadrature components used as information carrying waveforms in an existing standard or some proprietary communication system, although other manners for quantizing phase between two interacting communication devices can be used.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for establishing a symmetric encryption key between a first device and a second device, the method comprising:
   (a) transmitting a first carrier wave signal generated using circuitry at the first device, from the first device to the second device, the first carrier wave signal being characterized by a first center frequency and transmitted for a first predetermined time duration;
   (b) receiving the first carrier wave signal by the second device, the second device being configured to sample the first carrier wave signal for the first predetermined time duration at a second sampling rate to obtain a first phase difference value, the second sampling rate being characterized by a second center frequency generated by the second device substantially equal to the first center frequency;
   (c) transmitting a second carrier wave signal generated using circuitry at the second device, from the second device to the first device within a predetermined second time duration after receiving the first carrier wave signal, the second carrier wave signal being characterized by the second center frequency and transmitted for the first predetermined time duration;
   (d) receiving the second carrier wave signal by the first device, the first device being configured to sample the second carrier wave signal for the first predetermined time duration at a first sampling rate to obtain a second phase difference value, the first sampling rate being characterized by the first center frequency; and
   (e) establishing a first symmetric encryption key based on the first phase difference value and a second symmetric encryption key based on the second phase difference value.

2. The method of claim 1, wherein the first device is configured to convert the second phase difference value into a predetermined number of bits corresponding to the first symmetric encryption key.

3. The method of claim 2, wherein the second device is configured to convert the first phase difference value into a predetermined number of bits corresponding to the second symmetric encryption key.

4. The method of claim 1, determining an authenticity of the first symmetric encryption key and the second symmetric encryption key.

5. The method of claim 4, further comprising the step of establishing a communication channel between the first device and the second device if the first symmetric encryption key and the second symmetric encryption key are deemed authentic.

6. The method of claim 1, further comprising:
   repeating steps (a)-(d) N times such that the first device accumulates N second phase difference values and the second device accumulates N first phase difference values, N being an integer value;
   converting the N second phase difference values into first digital data corresponding to a first device symmetric encryption key; and
   converting the N first phase difference values into second digital data corresponding to a second device symmetric encryption key.

7. The method of claim 6, further comprising the step of pausing at least the predetermined second time duration between each repetition of steps (a)-(d).

8. The method of claim 1, further comprising:
   repeating steps (a)-(d) N times such that the first device accumulates N second phase difference values and the second device accumulates N first phase difference values, N being an integer value;
   converting the N second phase difference values into N second digital data portions, and converting the N first phase difference values into N first digital data portions; and
   concatenating the N second digital data portions to obtain a first device symmetric encryption key, and concatenating the N first digital data portions to obtain the second device symmetric encryption key, the first device symmetric encryption key and the second device symmetric encryption key corresponding to the symmetric encryption key.

9. The method of claim 8, further comprising the step of pausing at least the predetermined second time duration between each repetition of steps (a)-(d).

10. The method of claim 8, wherein each of the N second phase difference values are decorrelated from the other N-1 second phase difference values.

11. The method of claim 8, wherein each of the N first phase difference values are decorrelated from the other N-1 first phase difference values.

12. The method of claim 1, wherein the predetermined second time duration is selected such that a distance between the first device and the second device is substantially constant during the performance of steps (a)-(d).

13. A system comprising:
a first device comprising a first key encryption portion having a first transmitter configured to transmit a first carrier wave signal, and a first receiver configured to receive a second carrier wave signal, and a first control circuit coupled to the first key encryption portion, the first control circuit being configured to substantially perform the method of claim 1; and a second device comprising a second key encryption portion having a second transmitter configured to transmit the second carrier wave signal, and a second receiver configured to receive the first carrier wave signal, and a second control circuit coupled to the second key encryption portion, the second control circuit also being configured to substantially perform the method of claim 1.

14. The system of claim 13, wherein the first device includes a first antenna coupled to the first transmitter and the first receiver via a first multiplexer.

15. The system of claim 14, wherein the first receiver includes a first RF filter circuit coupled to the first multiplexer, the first RF filter circuit including a pass band centered at the first center frequency.

16. The system of claim 15, wherein the first receiver includes a first phase detector coupled to the first RF filter circuit, the first phase detector circuit being configured to sample the second carrier wave signal for the first predetermined time duration at the first sampling rate to obtain RF samples corresponding to the second phase difference value.

17. The system of claim 16, wherein the first receiver includes a first analog-to-digital converter (ADC), the first ADC being configured to convert the RF samples to obtain k bits of symmetric encryption key data to form at least a portion of the first symmetric encryption key, k being an integer value.

18. The system of claim 17, wherein the first controller is configured to repeat steps (a)-(d) N times to obtain N portions of the first symmetric encryption key, N being an integer value, the N portions being concatenated to obtain the first symmetric encryption key.

19. The system of claim 18, wherein the controller is configured to pause at least the predetermined second time duration between each repetition of steps (a)-(d).

20. The system of claim 13, wherein the first control circuit is coupled to at least one first memory circuit and the second control circuit is coupled to at least one second memory circuit, and wherein at least a portion of the method of claim 1, is stored in the at least one first memory circuit and the at least one second memory circuit.

21. The system of claim 20, wherein the at least one first memory circuit is coupled to the first control circuit by a system bus.

22. The system of claim 21, wherein the at least one first memory circuit selected from a group of memory circuits including read only memory, random access memory, FLASH memory or programmable memory.

23. The system of claim 20, wherein the at least one first memory circuit is a portable memory device coupled to the first control circuit by way of an interface circuit.

24. The system of claim 13, wherein the first control circuit is selected from a group of control circuits including an processor, an application specific integrated circuit, a field programmable gate array circuit or a combination of digital and analog circuits.

* * * * *